(12) United States Patent
Grant et al.

(10) Patent No.: US 9,748,599 B2
(45) Date of Patent: Aug. 29, 2017

(54) PHASED INTRODUCTION OF LITHIUM INTO THE PRE-LITHIATED ANODE OF A LITHIUM ION ELECTROCHEMICAL CELL

(71) Applicant: NANOSCALE COMPONENTS, INC., Hudson, NH (US)

(72) Inventors: Robert W. Grant, Camden, ME (US); Matthew Sweetland, Bedford, MA (US); Asela Maha Acharige, Old Town, ME (US); Ronald Wohl, Woodside, CA (US)

(73) Assignee: NANOSCALE COMPONENTS, INC., Hudson, NH (US)

( * ) Notice: Subject to any disclaimer, the term of this patent is extended or adjusted under 35 U.S.C. 154(b) by 384 days.

(21) Appl. No.: 14/167,076

(22) Filed: Jan. 29, 2014

(65) Prior Publication Data
US 2014/0310951 A1 Oct. 23, 2014

Related U.S. Application Data

(60) Provisional application No. 61/758,481, filed on Jan. 30, 2013.

(51) Int. Cl.
*H01M 10/0525* (2010.01)
*H01M 4/139* (2010.01)
*H01M 10/04* (2006.01)
*H01M 10/44* (2006.01)

(52) U.S. Cl.
CPC ....... *H01M 10/0525* (2013.01); *H01M 4/139* (2013.01); *H01M 10/049* (2013.01); *H01M 10/446* (2013.01); *Y10T 29/4911* (2015.01)

(58) Field of Classification Search
CPC ............. H01M 10/049; H01M 10/052; H01M 10/446; H01M 4/139; Y02E 60/122
See application file for complete search history.

(56) References Cited

U.S. PATENT DOCUMENTS

| 2,574,844 | A | 11/1951 | Roden |
| 2,943,033 | A | 6/1960 | Blue et al. |
| 4,029,564 | A | 6/1977 | Higuchi et al. |
| 4,130,500 | A | 12/1978 | Melendres et al. |
| 4,919,911 | A | 4/1990 | Shirota et al. |
| 4,940,640 | A | 7/1990 | MacDiarmid |

(Continued)

FOREIGN PATENT DOCUMENTS

| JP | 63-230706 | 9/1988 |
| JP | 03-166391 | 7/1991 |

(Continued)

OTHER PUBLICATIONS

Whittingham, M. S., "Lithium Batteries and Cathode Materials," Chemical Reviews, 104(10): 4271-4301 (2004).

(Continued)

*Primary Examiner* — Basia Ridley
*Assistant Examiner* — Heng Chan
(74) *Attorney, Agent, or Firm* — Elmore Patent Law Group, P.C.; Carolyn Elmore; Darlene Vanstone

(57) ABSTRACT

The present invention relates to a method for combining anode pre-lithiation, limited-voltage formation cycles, and accelerating aging via heated storage to maximize specific capacity, volumetric capacity density and capacity retention of a lithium-ion electrochemical cell.

16 Claims, 2 Drawing Sheets

(56) References Cited

U.S. PATENT DOCUMENTS

| | | |
|---|---|---|
| 5,023,149 A | 6/1991 | MacDiarmid et al. |
| 5,069,683 A | 12/1991 | Fong et al. |
| 5,166,063 A | 11/1992 | Johnson |
| 5,374,491 A | 12/1994 | Brannan et al. |
| 5,436,093 A | 7/1995 | Huang et al. |
| 5,595,837 A | 1/1997 | Olsen et al. |
| 5,712,059 A | 1/1998 | Barker et al. |
| 5,721,067 A | 2/1998 | Jacobs et al. |
| 5,753,388 A | 5/1998 | Koksbang et al. |
| 5,759,715 A | 6/1998 | Barker et al. |
| 5,928,812 A | 7/1999 | Xue |
| 6,068,755 A | 5/2000 | Matsuda et al. |
| 6,176,995 B1 | 1/2001 | Schneider |
| 6,475,670 B1 | 11/2002 | Ito |
| 7,122,106 B2 | 10/2006 | Lin et al. |
| 7,169,284 B1 | 1/2007 | Jiang et al. |
| 7,195,834 B2 | 3/2007 | Srinivas |
| 7,276,314 B2 | 10/2007 | Gao et al. |
| 8,021,496 B2 | 9/2011 | Yakovleva et al. |
| 8,529,746 B2 | 9/2013 | Grant et al. |
| 2003/0143461 A1 | 7/2003 | Poehler et al. |
| 2003/0170547 A1 | 9/2003 | Kim et al. |
| 2005/0140278 A1 | 6/2005 | Kato |
| 2006/0032752 A1 | 2/2006 | Luch |
| 2006/0057448 A1 | 3/2006 | Miyauchi et al. |
| 2006/0110660 A1 | 5/2006 | Satou et al. |
| 2006/0272950 A1 | 12/2006 | Martyak et al. |
| 2010/0120179 A1 | 5/2010 | Zhamu et al. |
| 2010/0291443 A1 | 11/2010 | Farmer |
| 2010/0297509 A1 | 11/2010 | Okumura et al. |
| 2011/0226987 A1 | 9/2011 | Yakovleva et al. |
| 2011/0236751 A1 | 9/2011 | Amiruddin et al. |
| 2012/0107680 A1* | 5/2012 | Amiruddin ........... H01M 4/386 429/206 |
| 2012/0251880 A1 | 10/2012 | Utsunomiya |
| 2012/0276450 A1 | 11/2012 | Chen et al. |
| 2012/0308884 A1 | 12/2012 | Oguni et al. |
| 2013/0327648 A1 | 12/2013 | Grant et al. |
| 2014/0166491 A1 | 6/2014 | Grant et al. |

FOREIGN PATENT DOCUMENTS

| | | |
|---|---|---|
| WO | 98/38224 A1 | 9/1998 |
| WO | 2005/033685 A2 | 4/2005 |
| WO | 2007/098203 A2 | 8/2007 |
| WO | 2008/124167 A1 | 10/2008 |
| WO | 2009/133411 A1 | 11/2009 |
| WO | 2013169862 A2 | 11/2013 |

OTHER PUBLICATIONS

Rauh, R. D., et al., "The Effect of Additives on Lithium Cycling in Propylene Carbonate," Electrochimica Acta, 22: 75-83 (1977).

Selim, R., et al., "Some Observations on Rechargeable Lithium Electrodes in a Propylene Carbonate Electrolyte," Journal of the Electrochemical Society, 121(11): 1457-1459 (1974).

Koch, V. R., et al., "The Stability of the Secondary Lithium Electrode in Tetrahydrofuran-Based Electrolytes," Journal of the Electrochemical Society, 125(9): 1371-1377 (1978).

Zou et al., "Remarkably enhanced capacitance of ordered polyaniline nanowires tailored by stepwise electrochemical deposition," J. Solid State Electrochem., 11: 317-322 (2007).

* cited by examiner

PHASED INTRODUCTION OF LITHIUM INTO THE PRE-LITHIATED ANODE OF A LITHIUM ION ELECTROCHEMICAL CELL

RELATED APPLICATION

This application claims the benefit of U.S. Provisional Application No. 61/758,481, filed on Jan. 30, 2013. The entire teachings of the above application are incorporated herein by reference.

BACKGROUND OF THE INVENTION

In the course of assembling and operating a lithium ion cell, various process steps are usually performed to optimize performance: 1) assembly; 2) vacuum drying; 3) electrolyte and protective additives filling; 4) sealing; 5) ambient aging; 6) formation cycling; 7) elevated temperature aging; 8) degassing and re-sealing; and 9) performance checking. There may be other process steps, but these may be considered to be the relevant ones. Assembly generally includes the mounting of at least one anode, one cathode, one separator and at least two contact leads into a pouch, a can, a button cell, or other gas tight enclosure. Vacuum drying generally includes an application of vacuum and heat prior to electrolyte filling. This process may last from about 12 hours to about three days. Electrolyte filling generally can be performed by injecting an electrolyte mixture into a vacuum dried pouch assembly and then vacuum sealing the pouch. Ambient aging generally allows the vacuum sealed cell to fully adsorb electrolyte prior to cycling for the first time. Formation cycling occurs by charging the completed cell at a low rate, usually over a 12 hour or longer period, in order to form a solid electrolyte interphase (SEI) or passivation layer primarily on the anode surfaces. These layers passivate the lithium active surfaces against additional reactions. A large amount of lithium can be lost in the first formation cycle (5 to 30% of initial capacity depending on anode type), but additional losses can continue to occur. Such ongoing losses are often significant, and may be up to, or greater than an additional 20% throughout customer cycling. For some customer purposes, elevated temperature aging is usually used to pre-age the cells so that the remaining cycles are more stable from the first customer cycle to the $200^{th}$ customer cycle. The elevated temperature aging step is typically performed at 50 to 60 degrees Centigrade, and may last for up to a week. During this step, additional lithium is lost along with the consumption of moisture molecules and electrolyte. The cell is then opened, degassed, and then resealed under vacuum conditions. After these steps are completed, the cell is ready for performance tests including initial capacity and capacity retention. Performance checks are made by cycling the cell at a prescribed rate and the cells are sorted for sale categories.

The losses of lithium can be categorized: (1) formation cycle building of SEI layers (primarily on the anode) by decomposition of the electrolyte; (2) the reduction of water molecules left over from the vacuum drying process and by diffusion through the package walls and seals; and (3) rebuilding of the SEI layers required due to the expansion and contraction of the active material layers (primarily in the anode). In standard (non-prelithiated) lithium ion cells, lithium is supplied by the cathode during the first charging cycle, and some cathode material forever becomes inactive as less lithium is returned to the cathode on subsequent charge cycles. This unused cathode material becomes "dead weight". Any additional loss of lithium will further subtract directly from specific capacity. Lithium can be added to the cell prior to assembly as described by U.S. patent application Ser. No. 13/688,912, which is incorporated herein by reference, to replace first cycle losses. The amount of pre-lithiation is usually selected to avoid formation of lithium metal or dendrites on the anode; maximum anode capacity cannot be exceeded during any charge cycle, and particularly not during the initial charge cycle. There is a need to extend the cathode capacity available for cycling and maximize the specific capacity for the target number of customer cycles.

The depletion of electrolyte occurs during: 1) The formation cycle and formation of initial SEI layers, primarily on the anode; 2) The elevated temperature aging cycle where additional electrolyte is consumed; and 3) Customer cycling. Reducing these losses could increase cell lifetime. Reducing electrolyte consumption could stabilize cell resistance and improve capacity retention. Reducing the consumption of electrolyte additives could reduce cell cost.

OBJECT OF THE INVENTION

It is the object of this invention to increase or improve the specific capacity, volumetric capacity density and capacity retention (as described by the retention rate measured between the first and $n^{th}$ customer cycle) in a lithium ion cell with the use of the phased introduction of lithium into pre-lithiated anodes of lithium ion cell sequence.

SUMMARY OF THE INVENTION

The invention relates to processes for lithiating and/or charging a lithium ion cell and to the cells produced by the processes. Heat and or partial formation cycling are used to accelerate and control lithium losses occurring in the early operation of a lithium-ion battery. The procedure described below combines anode pre-lithiation with controlled lithium loss generation and controlled transfer of lithium between cathode and anode in order to maximize cell cycling capability and retention.

In one embodiment, the process includes the steps of: a) pre-lithiating an anode; b) assembling the anode, a cathode, a separator and electrolyte into a sealed cell; c) charging, preferably partially charging, the cell; d) optionally discharging the cell and repeating step c), possibly at incrementally higher voltages to stimulate further SEI loss; e) optionally applying an elevated temperature for ½ to 7 or more days; f) optionally discharging the cell; and g) charging the cell to the normal full voltage.

In accordance with a preferred embodiment of the invention, the anode is pre-lithiated. The invention can use commercially available pre-lithiated anodes or can include the step of pre-lithiating the anode. Preferably, the anode is pre-lithiated in accordance with the processes described in U.S. Ser. No. 13/688,912, which is incorporated herein by reference. Alternately, the anode can be pre-lithiated using lithium bearing additives or lithium bearing powders. The pre-lithiating amount is preferably calculated to be approximately equal (+/−10%) to the expected initial formation cycle losses and the elevated temperature storage accelerated aging step losses. If the cathode to anode loading balance allows, the more preferred pre-lithiating amount is greater than the amount needed to offset formation and aging losses, in order to leave a reservoir of lithium to improve retention during customer cycling. Half-cell measurements can be useful to estimate the reversible capacities of the anode and cathode.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Example Pre-Lithiation Calculation

| | |
|---|---|
| Cathode reversible capacity, LiCoO$_2$ | $C_r$ = 3.2 mAhr/cm$^2$ |
| Anode maximum capacity (100% in FIG. 1) | $A_m$ = 3.5 mAhr/cm$^2$ |
| Pre-lithiation amount | P = 1.5 mAhr/cm$^2$ |
| Formation capacity loss | F = 0.7 mAhr/cm$^2$ |
| Elevated temperature age loss | E = 0.8 mAhr/cm$^2$ |
| Irreversible cathode Li$^+$ donation | $I_c$ = 0.0 mAhr/cm$^2$ |

Before the pre-lithiation amount is determined, full cell capacity values of F and E are measured for the intended anode and cathode combination. The pre-lithiation amount added is preferably in accordance with the formula: $P \geq F + E - I_c$, subject to the constraint that the total amount of lithium residing in the anode must be always less than $A_m$. For example, in the cell of Example 1, $A_m$ was measured to be 3.5 mAh/cm$^2$, F was measured to be 0.7 mAh/cm$^2$; E was measured to be 0.8 mAh/cm$^2$, $I_c$ was estimated to be 0.0 mAh/cm$^2$, and P was determined to be between 1.5 and 3.5 mAhrs/cm$^2$.

Figure 2:
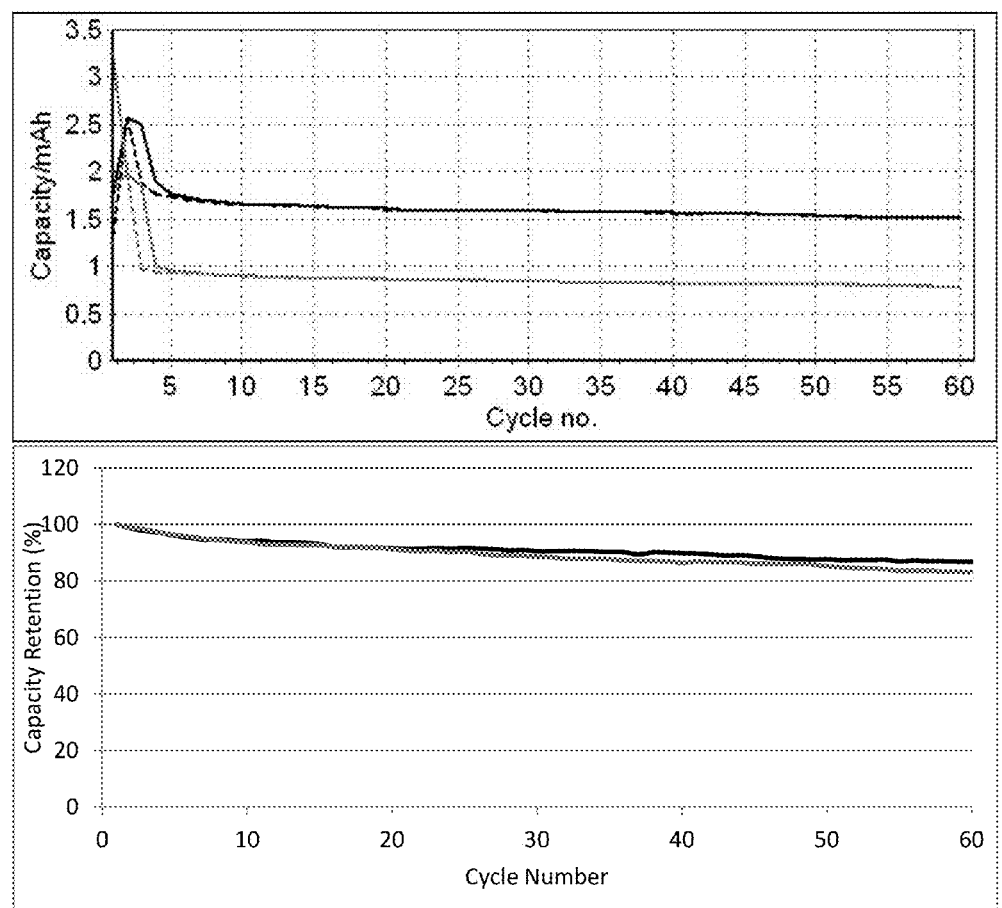
FIG. 2. Comparison of cells. The cell shown by the upper lines in each graph uses the phased introduction of lithium into pre-lithiated anodes of lithium ion cell. The lower line in each graph represents a control cell.

Pre-lithiation is understood here to mean lithium added to the anode prior to cell assembly. Other sources of lithium include those of the cathode. A highest reversible lithium capacity for an anode can be achieved by the phased introduction of lithium by pre-lithiation, forming, aging the cell, and final introduction of lithium from the cathode by the full voltage charging step. By following this sequence, anode reversible capacity is optimized while never violating the maximum lithium content where dendrites would form. FIG. 2 indicates the capacities and retention characteristics of a cell processed with the new pre-lithiated sequence and a control. The button cell used here for example is composed of a graphite anode and a lithium cobalt oxide cathode. For other types of cathodes and anodes, the degree of improvement varies with the initial and elevated temperature losses in accordance with the calculations shown above. Some cathodes are designed to give extra lithium during the first charge irreversibly but this strategy leaves additional dead weight as a result. For cells with such cathodes, the method described herein of limiting the first cycle charge can also benefit the final cell capacity while protecting the anode from violating the maximum lithium content limit. Most cathodes have low levels of irreversible and reversible losses. Some anodes have low initial losses but these types of anodes typically have low rate capability. In general, this phased introduction of lithium is most valuable in cases where significant losses would otherwise take place.

The anode typically comprises a compatible anodic material which is a material which functions as an anode in an electrolytic cell. The term anode is intended to include negative electrodes, conductive foils, anode sheets, anode substrates, or non-reactive plating-capable foils. In one embodiment, anodes are lithium-intercalating anodes. Examples of materials that comprise lithium-intercalating anodes include but are not limited to carbon, graphite, tin oxide, silicon, silicon oxide, polyvinylidene difluoride (PVDF) binder, and mixtures thereof. In a further embodiment, lithium-intercalating anode materials are selected from graphite, cokes, mesocarbons, carbon nanowires, carbon fibers, silicon nanoparticles or other metal nanomaterials and mixtures thereof. In another embodiment, alloying metals such as tin or aluminum may be used to host the lithium metal.

During the pre-lithiation step, a reducing current is applied to the anode in such a way as to intercalate (or otherwise host) the lithium. The anode is bathed in a solution comprising a non-aqueous solvent and at least one dissolved lithium salt, preferably LiCl. The term non-aqueous solvent is a low molecular weight organic solvent added to an electrolyte which serves the purpose of solvating the inorganic Li salt. Typical examples of a non-aqueous solvents are butylene carbonate, propylene carbonate, ethylene carbonate, vinylene carbonate, vinyl ethylene carbonate, dimethyl carbonate, diethyl carbonate, dipropyl carbonate, methyl ethyl carbonate, acetonitrile, gamma-butyrolactone, triglyme, tetraglyme, dimethylsulfoxide, dioxolane, sulfolane, room temperature ionic liquids (RTIL) and mixtures thereof. In one embodiment, a non-aqueous solvent is selected from ethylene carbonate, vinylene carbonate, vinyl ethylene carbonate, gamma-butyrolactone, and mixtures thereof. In a second embodiment, a non-aqueous solvent is gamma-butyrolactone. In a third embodiment, an additive can be introduced to support high quality SEI formation. The additive could be vinylene carbonate, ethylene carbonate, fluorinated ethylene carbonate, or maleic anhydride. In a fourth embodiment, a gas such as $CO_2$ or $SO_2$ is sparged into the non-aqueous solution in order to: increase salt solubility; increase the ionic conductivity; support the formation of $Li_2CO_3$ or $Li_2SO_3$ SEI layer; and increase the lithiation efficiency.

Inexpensive salts with gaseous decomposition products can be halides such as LiCl, LiBr, and LiF. LiCl and other simple salts can be difficult to dissolve or ionize in non-aqueous solvents. Solvents such as propylene carbonate (PC), dimethyl carbonate (DMC), and acetonitrile support only trace amounts of LiCl in solution without the use of a complexing agent such as $AlCl_3$. $AlCl_3$ and other complexing agents can be difficult to handle in regard to moisture management and high corrosivity. In addition, some solvents that can dissolve halide salts, such as DMSO or tetrahydrofuran (THF), do not allow complete ionization of the salt, and/or attack the binding polymers in the anode composites. Gamma-butyrolactone has been found to facilitate the dissolution and ionization of the desirable alkali metal halide salts. It combines good solubility of the alkali metal halide salts with compatibility with TFE Teflon$_c$, PVDF, butadiene rubber and other binders. The use of halide salts with gaseous decomposition products such as LiCl minimizes the production of solid precipitates during the lithiation process. Since the lithiation process products are primarily lithium ions and gas, there are few solid precipitates or intermediate compounds that can accumulate in the non-aqueous solvent solution. Removal of dissolved gas from the non-aqueous solvent solution is preferred over solid precipitates during long term continuous operation of a production system.

Gamma-butyrolactone also has a capable electrochemical window, including the lithium potential near −3 volts vs. a standard hydrogen electrode (SHE). It is a capable electrolyte with high permittivity and low freezing point, and can dissolve and ionize up to a 1 M concentration of LiCl. A modest amount of heat can be used to reach this value. In one embodiment, the heat to dissolve and ionize up to a 1 M concentration of LiCl is between about 20° C. and 65° C., such as between 30° C. and 65° C., such as between 38° C. and 55° C. In a more preferred embodiment, the heat is between about 25° C. and 55° C. In a most preferred embodiment, the heat is about 25° C.

The lithiation tank can also have an internal circulating pump and distribution manifold to prevent localized salt concentration deprivation.

Dissolved gas such as $CO_2$ or $SO_2$ can enhance the lithiation process. It increases the solubility of the salt, the ionic conductivity of the non-aqueous solvent, and doubles the efficiency of lithiation. Since $CO_2$ is inexpensive, easily dried, chemically safe, and a potential building block gas for a high quality SEI layer, it has been selected as the preferred dissolved gas. $CO_2$ preferentially reacts with trace $H_2O$ and $Li^+$ during the lithiation process to form a stable, insoluble SEI material ($Li_2O$, $Li_2CO_3$ etc.). The moisture level in the lithiation tank is driven down by the consumption of $CO_2$ and $H_2O$ according to this process, and care is given to control the moisture level in the tank to between about 5 to 20 ppm. In this way, anode lithiation with a quality SEI material is produced continuously.

The intercalation or plating process for lithium ions (or generally lithiation) from 1 or 0.5 M LiCl salt, for example, in gamma-butyrolactone solvent will occur at about 4.1 volts measured between the anode sheet and the reference electrode up to a reducing current density of 2 $mA/cm^2$ or more. As intercalation rates are increased too far beyond this current density, dendrites or lithium plating may begin to take place which harm the final battery or electrochemical cell performance. This current density limit will vary depending on the graphite or other anode material porosity etc. In order to control both the currents and dependant voltages accurately, it may be necessary to divide the field plate into zones. Other metals can also be plated or intercalated with this method including sodium as an example. As mentioned above, the byproduct of the intercalation process when using a halide alkali metal salt is an evolving gas at the counter electrode (field plate). In a preferred embodiment, the evolving gas is selected from $F_2$, $Cl_2$, $Br_2$, and mixtures thereof. In a more preferred embodiment, the evolving gas is $Cl_2$.

Prior to entering the lithiation bath, the anode material can be pre-soaked in an electrolyte solution. The pre-soaking of the anode material will ensure full wetting of the material prior to the start of the lithiation process. This pre-soak bath can contain a non-aqueous solvent with or without a lithium salt, with or without a sparge gas, and with or without an SEI promoting additive.

The evolution of gas at the field plate or counter electrode can result in evolving gas entering into, and/or being released from, the bath solution. As a result, controlling the build-up of dissolved and released gas is desired to avoid corrosion, as for example, in the hypothetical case of trace water contamination reacting with chlorine gas, to form HCl during chlorine gas evolution. The tank assembly can be configured to control the introduction of moisture into the system by using a dry gas blanket on top of the liquid. In one embodiment, the dry gas (1-10 ppm moisture) is selected from helium (He), neon (Ne), argon (Ar), krypton (Kr), xenon (Xe), sulfur hexafluoride ($SF_6$), nitrogen ($N_2$), dry air, carbon dioxide ($CO_2$) and mixtures thereof. In a preferred embodiment, the dry gas is selected from nitrogen, argon, carbon dioxide, dry air and mixtures thereof. Moisture ingress can also be controlled by having a long narrow gap entry and exit tunnel for the anode film where a counter flowing dry gas is used to mitigate air entry into the system.

The process and apparatus can preferably continuously control moisture, gas, and small quantities of lithiated organic compounds during a continuous lithiation process. Liquid can be drawn from a bath through a series of valves. The liquid can be delivered in a batch mode to a refluxing unit, or it can be continuously circulated through a conditioning loop including distillation or reverse osmosis. The reflux unit can take batches of material through a vacuum refluxing process that will remove both accumulated gas as well as moisture from the liquid. In one embodiment, the accumulated gas is selected from $F_2$, $Cl_2$, $Br_2$, and mixtures thereof. In a more preferred embodiment, the accumulated gas is $Cl_2$. The use of reflux conditioning instead of a distillation process can prevent a change in the salt concentration of the working fluid which would result in a loss of salt content through precipitation. Once the batch liquid has been refluxed for a designated period of time, the liquid can be returned to the bath with a lower moisture and gas content. The size and rate of the reflux unit can be matched to the moisture ingress rate and to the gas production rate in order keep the bath liquid at optimum conditions. The reflux rate can be increased through use of multiple simultaneous batches and through the use of high rate reflux equipment such as a rotary evaporator and high vacuum conditions. The reflux batch moisture content typically decays in an exponential fashion and the turnover rate can be tuned for optimal moisture control with minimal energy input and equipment cost.

The refluxing unit can be placed after a salt dosing unit. The salt dosing unit can be used to add and mix the desired salt into the non-aqueous solvent solution. The temperature of the dosing unit can be held to maximize the solubility of the salt in the electrolyte and the elevated temperature can also be used as a pre-heating step for the refluxing unit. In one embodiment, the dosing unit maintains an elevated process temperature of between about 20° C. and 65° C., such as between 30° C. and 65° C. or 38° C. and 55° C. In a more preferred embodiment, the dosing unit maintains an elevated process temperature of between about 25° C. and 55° C. In a most preferred embodiment, the dosing unit maintains an elevated process temperature of about 25° C. The benefit of dosing in the salt in a dosing unit before the refluxing unit is that the salt does not have to be in a completely dry state. Removing the moisture from a solid phase salt can be very difficult. Once a salt is dissolved into solution, however, the water content of the salt can be removed through the refluxing process. Maintaining the dosing unit at an elevated temperature increases the solubility of the lithium salt in the non-aqueous solvent and ensures full dissolution of the salt prior to the refluxing unit.

The conditioning/replenishment loop operates in a continuous mode and can also be used to remove dissolved gases from the bath liquid through use of a membrane contactor. The gas output from the membrane contactor and the reflux unit can be passed through a scrubber to capture any effluent, such as chlorine gas, produced by the process.

In one embodiment, the dissolved gases are selected from $F_2$, $Cl_2$, $Br_2$, and mixtures thereof. In a more preferred embodiment, the dissolved gas is $Cl_2$. The bath liquid can also be paired against either vacuum or a dry gas within the membrane contactor in order to remove unwanted gases. In one embodiment, the dry gas is selected from helium (He), neon (Ne), argon (Ar), krypton (Kr), xenon (Xe), sulfur hexafluoride ($SF_6$) nitrogen ($N_2$), carbon dioxide ($CO_2$), dry air and mixtures thereof. In a preferred embodiment, the dry gas is selected from nitrogen, argon, carbon dioxide, dry air and mixtures thereof.

An inline heater/chiller can be used to maintain a desired tank temperature to maintain consistent bath operating conditions, even with variations in facility temperature. Controlled lithiation tank temperatures can aid in the formation of a high quality SEI layer. In one embodiment, the inline heater/chiller maintains a tank temperature of between about 20° C. and 55° C. In a more preferred embodiment, the inline heater/chiller maintains a tank temperature of between about 20° C. and 30° C. In a most preferred embodiment, the inline heater maintains an elevated tank temperature of about 25° C.

A filter unit can be used to remove any accumulated particulate contamination. The filter unit can be located at various points in the loop including prior to the pump and after the salt dosing unit. The filter unit can be used to remove particulates from the non-aqueous solvent in cases where a non-halide lithium salt such as $LiNO_3$ is used such that a precipitate may be formed at the field plates.

Lithium halide salt can be added to the non-aqueous solvent using the salt dosing unit. An excess of solid lithium salt can be maintained within the dosing unit to keep the lithium salt concentration within the loop and within the bath at the desired level (i.e., a saturated solution of about 0.5 M to 1.0 M) over long periods of time. The dosing unit can be configured to keep the solid salt from entering the bath or refluxing unit. By dosing salt prior to the refluxing unit, there is no need to separately dry the salt with its high water binding energy in its granular state. In one embodiment, the lithium salt within the salt dosing unit is selected from LiF, LiCl, LiBr, and mixtures thereof. In a preferred embodiment, the lithium halide salt within the salt dosing unit is LiCl. Dissolved lithium salts can be carried through the rest of the loop. The fluid circulation loop pump rate can be matched to maintain a constant lithium salt concentration in the tank. For a given anode substrate process rate, a matching loop circulation rate will dose the same amount of lithium salt as the lithiation process consumes. As the anode process rate is increased or decreased, the loop circulation rate can be modified to maintain an equilibrium state within the bath.

Depending on the specific tank conditions, the bath fluid can be treated using a circulating loop, a refluxing unit or a distillation unit. A circulating loop can dose in salt, remove dissolved gases, control the bath temperature and remove particulate contaminants. A refluxing unit is effective at removing dissolved gases and for removing moisture content without reducing the salt content of the solution. A distillation unit is effective at removing dissolved gases, removing moisture content, removing all salt content and removing lithiated organic compounds. The output from the distillation unit can be fed back into a dosing and refluxing unit to reestablish the salt content if required. The effluent from the distillation unit can be collected and treated to recover used salt for reuse in the lithiation process. For example, DMC solvent will rinse away all but the insoluble salt so that the salt may be re-introduced into the dosing unit.

Recirculating loops, refluxing unit and distillation units can be shared across multiple tanks that have different input and output requirements as a means of minimizing equipment size and cost.

When the anode is lithiated to the extent of the irreversible and extended cyclic loss amount, as well as the intended cycling amount, it can be assembled into a battery or electrochemical cell with a cathode material that does not initially contain lithium. This type of cathode material can be much less expensive than lithium containing cathode materials, and examples include, but are not limited to, $MnO_2$, $V_2O_5$ and polyaniline. The cost of the battery or cell produced with this method will be lower due to the lower cost of the feedstock lithium salt. Alternatively, the cathode can contain lithium.

The anode, cathode and separator are then assembled into a cell housing, such as a button cell housing. The cell is preferably vacuum dried.

Electrolyte is added, and the cell is sealed, preferably during an applied vacuum. Preferred electrolytes include EC/DMC/DEC and 1M $LiPF_6$ and 1% VC. The cell is then sealed (e.g., vacuum sealed) and preferably stored at ambient temperature (between about 15 and 30° C., preferably about 20° C.) for 6 to 24 hours, preferably between 12 and 13 hours, to allow for electrolyte adsorption and swelling.

The first formation cycle charge step can be performed to a voltage above that of electrolyte reduction (typically around 3.7 volts for a carbonate based electrolyte system, such as 1/1/1 EC/DMC/DEC and 1M $LiPF_6$ and 1% VC with graphite anodes) but below that voltage where a resulting lithium dosage would be higher than the anode's maximum lithium capacity or that would result in dendrite formation. The anode's maximum lithium capacity can be measured in half-cell. The appropriate formation cycle charge voltage is determined empirically by measuring capacity, and insuring that the anode's maximum lithium handling capacity is not exceeded. This step typically results in, or stimulates, a partial formation of the SEI layer. In a preferred embodiment, approximately 90% of the SEI layer is formed.

The formation cycle, or charging step, above can optionally be repeated one or more times to further complete the formation of the SEI. The preferred SEI layer is judged to be more complete when subsequent cycles exhibit low capacity loss, indicating the low lithium loss or high capacity retention. Optionally, the formation cycle(s) can be performed at an elevated temperature such as 50 degrees Centigrade to combine the benefits of the formation cycle with that of elevated temperature aging mentioned below.

After the formation cycles are completed, the cell is optionally left in the charged or partially charged state and aged under heat for 12 hours to one week (or more) between 25° C. and about 60° C. or higher. Preferably, the aging step is performed between 1 to 10 days, more preferably 3 days. Higher temperatures may be used if they are not detrimental to the cell. After the cell is aged and cooled back to ambient conditions, the cell is optionally discharged.

The cell can then be charged to the desired charging voltage for the cathode-anode system or cell. For example, in the graphite anode and $LiCoO_2$ cathode system, the charging voltage is typically 4.2 volts.

The cell is now ready to be discharged for performance testing. At this point, the anode lithium losses due to the formation cycles and the accelerated aging have occurred and have been compensated by the pre-lithiated lithium dosage, without exceeding the anode's lithium loading limit and avoiding dendrite formation (see FIG. 2). When the cell is now cycled, the cathode's reversible lithium amount can be cycled and little dead weight is left in the cathode (a small value is shown in the diagram for cathode presence only). A similar cathode capacity is exhibited in the half cell where no limitation of lithium is present. Optionally, the cell can be opened and vacuum resealed at this time.

By managing the source and timing of the lithium introduction in this way, the lithium ion cell can be safely optimized for specific and volumetric capacity and capacity retention. Optionally, the formation cycle can be performed at an elevated temperature such as around 35° C. to 50° C. in order to accelerate losses and possibly improve the nature of the SEI material.

This method is different from the alternative assembly techniques for both standard (non-prelithiated) and pre-lithiated anodes. In a standard anode condition, the mass of the cathode is selected to prevent the plating of lithium (Li) on the anode during the first charge after accounting for lithium losses due to the initial formation cycle capacity loss. Secondary losses due to elevated temperature storage and customer cycling directly impact cell capacity. If the initial cathode is too large, then lithium will plate onto the anode during the first formation cycle which will cause dendrites and will lead to early cell failure due to shorting between the anode and cathode. If the initial cathode is too small, then the cell specific capacity will be lower. In both of these cases, there will be "dead weight" associated with unused cathode capacity after the first formation cycle and this "dead weight" will increase during heated temperature storage and customer cycling.

If a pre-lithiated anode is charged against the matching cathode, but without one or more capacity-limited initial formation cycles, either there will be dendrites or a lost opportunity to support full cathode capacity with maximum capacity retention. Compensating for SEI loss only is still an improvement over the standard non-prelithiated anode situation, but the lithium losses that occur during the heated storage step and or subsequent cycling cannot be recovered.

The combination of pre-lithiating an anode, limiting initial formation cycles, and accelerating aging via heated storage and or heated formation allows for the maximum addition of lithium to compensate for SEI and other lithium losses through the entire manufacturing process. This results in higher specific and volumetric capacity and capacity retention (See FIG. 2).

In addition to a single limited formation step (charge step) of a cell prior to the optional elevated temperature storage, a series of limited incremental formation steps may also be performed, possibly to varying cell voltages such as an initial charge to 3.7 V, followed by a discharge, then a secondary charge to 3.8 V.

Example

The following is a detailed example of an anode preparation and processing. 25 micron thick copper foil was cleaned with isopropyl alcohol and Kimberly-Clark Kimwipes to remove oil and debris and then dried in air. A solution was prepared by adding 2.1 grams of 1,000,000 weight PVDF powder from Arkema Fluoropolymers Div. to 95 ml of dry NMP solvent from Aldrich Chemical. The solution was mixed with a stir bar overnight to fully dissolve the PVDF material. The solution was kept in the dark to prevent the light sensitive solvent from reacting. 33.9 ml of this PVDF solution was then added to 15 grams of Conoco Philips CPreme G5 graphite and 0.33 grams of acetylene black and stirred for 2 hours in a ball mill at 600 RPM with a single 3/8" diameter stainless steel ball. The resulting slurry was cast onto the copper foil using a vacuum hold down plate with heating capability. The finished graphite thickness after casting and drying at 120° C. was about 100 microns or 14 mg/cm$^2$. The anode sheet was then die punched into 15 mm diameter discs and then pressed at about 3000 psi and 120° C. for use in a 2032 button cell assembly. The copper/graphite anode discs were then vacuum baked at 125° C. and about 1 mTorr in a National Appliance Company model 5851 vacuum oven for at least 12 hours.

Figure 1:
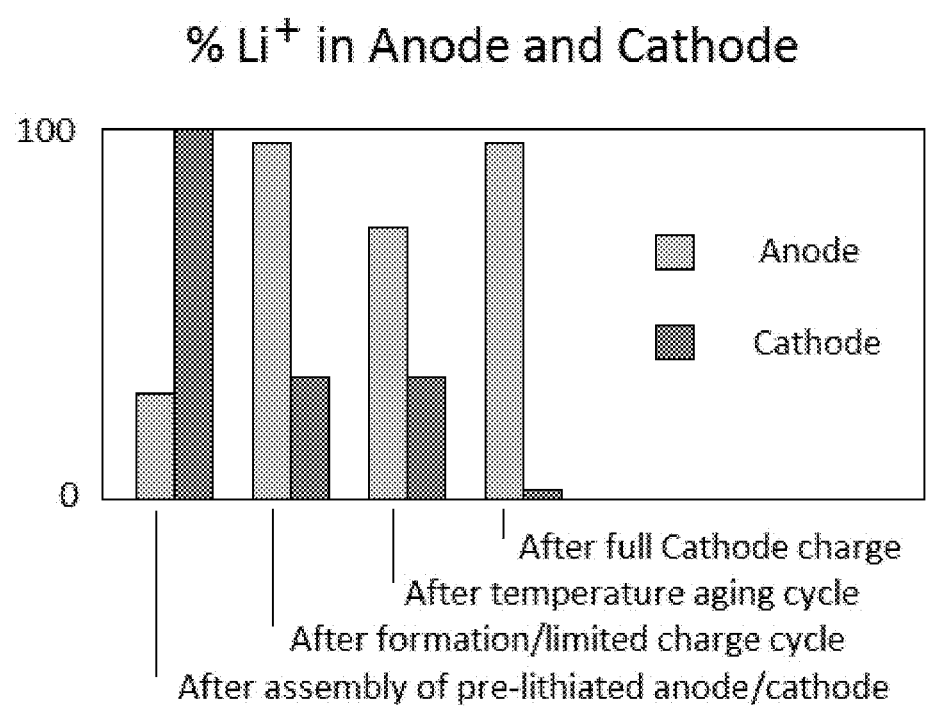
FIG. 1. Illustration of lithium movement across anode and cathode during phased introduction of lithium into pre-lithiated anodes of lithium ion cell. Percentages are relative to maximum lithium capacity of each electrode.

The anode discs were then transferred into a Terra Universal dry air glove box with −65° C. dew point air supplied by compressed dry air passed through a Kaeser two stage regenerative drier. The anode discs were then vacuum infiltrated with a GBL solvent with a 0.5 M concentration of LiCl salt solution. This electrolyte solution had been prepared by heating to 90° C. and then vacuum refluxing at about 1 mTorr for 6 hours to remove moisture down to about 10 ppm. The anode discs were allowed to soak for a half hour at vacuum conditions, a half hour in atmospheric pressure conditions and a half hour in the lithiation vessel itself prior to any currents being passed. The lithiation vessel included a constant bubbling of $CO_2$ gas to achieve a saturation level and a temperature of 30° C. Test leads from a Maccor 4300 battery tester were connected to the anode sample (black working) and glassy carbon (red counter) electrode. Voltage at the working electrode is monitored via an $Ag/AgNO_3$ non-aqueous reference electrode. A reducing current of 2 mA/cm$^2$ was applied to the graphite anode until a total of 1.5 mAhr/cm$^2$ was achieved. The pre-lithiated anode disc was then rinsed in pure distilled GBL and vacuum dried. The anode discs were then assembled against either $LiFePO_4$ or LiCoO2 12 mm diameter cathode discs. The separator used was Celguard 2400, and about 0.2 ml of electrolyte was used in the assembly. The electrolyte was 1:1:1 EC:DMC:DEC with 1M $LiPF_6$ salt and 1% VC with moisture levels at about 10 ppm. A vacuum was applied to the assembled cell to remove bubbles before venting with a dry gas and crimping in an MTI model MT-160D crimping tool. The graphite/lithium cobalt oxide button cell was connected to the Maccor Series 4000 Battery Test system for processing as follows: 1) A first charge was applied to the cell by a constant current of 0.25 mA/cm$^2$ to a voltage of 3.7 in order to bring 1.7 mAhr/cm$^2$ additional lithium into the anode. The total amount of lithium dosed (1.5 mAhr/cm$^2$ from pre-lithiation and 1.7 mAhr/cm$^2$ from the cathode) into the anode was safely below the maximum amount of 3.5 mAhr/cm$^2$. At this voltage, significant SEI formation has taken place and about 0.7 mAhr equivalent lithium has been consumed. This is reflected in FIG. 1 as After Formation/Limited Charge Cycle. 2) The cell was then subjected to an elevated temperature of about 50° C. for 3 days in order to accelerate the aging that usually takes place within the first 200 or so customer cycles. This accounts for an additional 0.8 mAhr/cm$^2$ equivalent of lithium loss. FIG. 1 represents this step as After Temperature Aging Cycle. 3) The cell is now reconnected to the Maccor 4000 test system at room temperature and charged up to the normal voltage for the cathode system at a C/3 rate. The voltage setting was 4.2V for the charge and 2V for the discharge and the current was 1 mA/cm$^2$. This is represented by the After Full Cathode Charge in FIG. 1. 4) The cell was then discharged and charged for performance tests with results shown in FIG. 2.

While this invention has been particularly shown and described with references to preferred embodiments thereof, it will be understood by those skilled in the art that various changes in form and details may be made therein without departing from the scope of the invention encompassed by the appended claims.

What is claimed:

1. A process of maximizing specific capacity and capacity retention of a lithium ion cell comprising: a) pre-lithiating an anode; b) assembling the anode, a cathode, a separator and electrolyte into a sealed cell; c) charging the cell to a voltage above that of electrolyte reduction but below that voltage that would violate the anode maximum safe lithium capacity; d) discharging or partially discharging the cell; and e) charging the cell to the full voltage, wherein the cathode does not initially contain lithium when assembled.

2. A process as in claim 1, wherein steps (c) and (d) are repeated.

3. A process as in claim 1, wherein an elevated temperature is applied to the cell after step (c) for ½ to 7 or more days.

4. A process as in claim 1, where cell specific capacity and volumetric capacity density are increased.

5. A process as in claim 1, where cell capacity retention is increased.

6. A process as in claim 1, in which steps (c) and (d) are performed at elevated temperatures.

7. A process as in claim 1, wherein steps (c) and (d) are repeated and step (c) is repeated at incrementally higher voltages to stimulate further solid electrolyte interphase loss.

8. A process as in claim 1, wherein step (a) comprises applying a reducing current to an anode material bathed in a solution comprising a non-aqueous solvent and at least one dissolved lithium salt to add a pre-lithiation amount P, wherein $$P \geq F + E - I_c,$$

$A_m$=Anode maximum capacity;
F=Formation capacity loss;
E=Elevated temperature age loss; and
$I_c$=Irreversible cathode Li$^+$ donation,
and the total amount of lithium residing in the anode must be always less than $A_m$.

9. A process of claim 8, wherein the lithium salt is lithium chloride and the solvent is gamma-butyrolactone.

10. A process of maximizing specific capacity and capacity retention of a lithium ion cell comprising: a) pre-lithiating an anode; b) assembling the anode, a cathode, a separator and electrolyte into a sealed cell; c) heating the cell to an elevated temperature; d) charging the heated cell to a voltage above that of electrolyte reduction but below that voltage that would violate the anode maximum safe lithium capacity; e) optionally discharging the cell and repeating step (c) above; f) optionally discharging the cell; and g) charging the cell to the full voltage, wherein the cathode does not initially contain lithium when assembled.

11. A process as in claim 10, where cell specific capacity and volumetric capacity density are increased.

12. A process as in claim 10, where cell capacity retention is increased.

13. A process as in claim 10, in which a storage step at elevated temperature is used prior to step g.

14. A process as in claim 10, wherein step (a) comprises applying a reducing current to an anode material bathed in a solution comprising a non-aqueous solvent and at least one dissolved lithium salt to add a pre-lithiation amount P, wherein $$P \geq F + E - I_c,$$

$A_m$=Anode maximum capacity;
F=Formation capacity loss;
E=Elevated temperature age loss; and
$I_c$=Irreversible cathode Li$^+$ donation,
and the total amount of lithium residing in the anode must be always less than $A_m$.

15. A process of claim 14, wherein the lithium salt is lithium chloride and the solvent is gamma-butyrolactone.

16. A process of maximizing specific capacity and capacity retention of a lithium ion cell comprising: a) providing a pre-lithiated anode; b) assembling the anode, a cathode, a separator and electrolyte into a sealed cell; c) charging the cell to a voltage above that of electrolyte reduction but below that voltage that would violate the anode maximum safe lithium capacity; d) discharging or partially discharging the cell; and e) charging the cell to the full voltage, wherein the cathode does not initially contain lithium when assembled.

* * * * *